United States Patent [19]

Naganuma

[11] Patent Number: 5,349,871
[45] Date of Patent: Sep. 27, 1994

[54] LOAD SENSING DEVICE HAVING IMPROVED LOAD SENSING ABILITY

[75] Inventor: Mikio Naganuma, Yokohama, Japan

[73] Assignee: TEAC Corporation, Japan

[21] Appl. No.: 943,444

[22] Filed: Sep. 10, 1992

[30] Foreign Application Priority Data

Sep. 18, 1991 [JP] Japan .................. 3-238443

[51] Int. Cl.[5] ................................. G01L 1/22
[52] U.S. Cl. ..................... 73/862.635; 73/862.635
[58] Field of Search ............ 73/862.635, 862.632, 73/862.637, 862.642, 862.633, 862.638, 862.627

[56] References Cited

U.S. PATENT DOCUMENTS

| | | | |
|---|---|---|---|
| 3,216,245 | 11/1965 | Seed | 73/862.635 X |
| 3,365,689 | 1/1968 | Kutsay | 73/862.632 X |
| 3,422,445 | 1/1969 | Jacobsen | 73/862.633 X |
| 3,433,063 | 3/1969 | Ten Cate | 73/862.633 X |
| 3,433,064 | 3/1969 | Jacobson | 73/862.632 X |
| 3,535,923 | 10/1970 | Martorana et al. | 73/862.642 |
| 3,696,317 | 10/1972 | Farr | 73/862.632 X |
| 3,706,349 | 12/1972 | Paelian et al. | 73/862.632 X |
| 3,712,123 | 1/1973 | Laimins | 73/862.632 |
| 3,871,216 | 3/1975 | Eder | 73/862.635 |
| 4,065,962 | 1/1978 | Shoberg | 73/862.635 X |
| 4,168,518 | 9/1979 | Lee | 73/862.638 X |
| 4,423,793 | 1/1984 | Caris | 73/862.635 |
| 4,453,422 | 6/1984 | Yorgiadis | 73/862.635 X |
| 4,545,262 | 10/1985 | Hellwig | 73/862.635 |
| 4,811,610 | 3/1989 | Gassmann | 73/862.635 |
| 4,854,179 | 8/1989 | Haggstrom | 73/862.632 |
| 5,014,799 | 5/1991 | Sato et al. | 73/862.652 X |
| 5,052,505 | 10/1991 | Naito et al. | 177/229 |
| 5,111,702 | 5/1992 | Antkowiak | 73/862.635 |

FOREIGN PATENT DOCUMENTS

| 3342817 | 2/1974 | Fed. Rep. of Germany . |
| 2132012 | 1/1986 | Fed. Rep. of Germany . |
| 150537 | 12/1990 | Japan . |

Primary Examiner—Richard E. Chilcot, Jr.
Assistant Examiner—Elizabeth L. Dougherty
Attorney, Agent, or Firm—Sceales, Starke & Sawall Andrus

[57] ABSTRACT

A body portion comprises a load bearing portion for being displaced due to a load being applied thereto in a load applying direction, and a plurality of strain portions for being strained as a result of displacement of the load bearing portion due to the load being applied thereto, the plurality of strain portions being respectively integrated with the load bearing portion in positions symmetrical to each other with respect to the load bearing portion. Each portion of the plurality of strain portions respectively has horizontal hole formed in directions approximately perpendicular to the load applying direction. The load sensing device further comprises a strain sensor for sensing strains occurring in the plurality of strain portions so as to sense the load applied to the load bearing portion.

7 Claims, 14 Drawing Sheets

LOAD SENSING DEVICE HAVING IMPROVED LOAD SENSING ABILITY

BACKGROUND OF THE INVENTION

The present invention relates to a load sensing device for sensing a heavy load, for example, a load loaded on a big truck, or steel materials hanging from an overhead crane, or iron ore or steel materials or coil-shaped steel sheets transported in an ironworks and other heavy equipment employing factories. The present invention particularly relates to a load sensing device having a composition in which a smaller load can also be sensed. Such a load sensing device has a strain gauge sensing a strain occurring in a body of this device as a result of loaded material so that a load can be sensed.

A construction of one example of a load sensing device 1 in the prior art is described below with reference to FIG. 1. In FIG. 1, an outer part of the sensing device 1 is cut and removed for the sake of showing an internal construction thereof.

A manufacturing method of the load sensing device 1 is described below. A cylinder of height h is formed as a result of cutting an aluminum bar. Then a top of the cylinder is machined so that a top of a load bearing portion 2, to which a load is applied, protrudes. A plurality of vertical holes 4 are bored vertically between the load bearing portion 2 and a ring-shaped outer edge portion 3, in positions separated from each other by constant intervals. Thus, a plurality of strain portions 5 extending horizontally and radially from the load bearing portion are formed in the above mentioned intervals. The strain portions are formed so as to connect between the load bearing portion 2 and the outer edge portion 3 which is static when the load bearing portion is displaced due to application of a load. Strain occurs in the strain portions 5 when a load is applied to the load bearing portion from upward, vertically.

Strain gauges 6 are adhered on side walls of the strain portion. Strains in the strain portions, caused by a load applied to the load bearing portion, are sensed by the strain gauges 6.

The total number of strain gauges 6 is 8 because two gauges are provided on respective front and rear side walls of each of four strain portions 5. The strain gauges 6 are wired so as to compose a bridge circuit for eliminating error due to an expansion caused by heat. A connector 7 is connected to an output terminal of each strain gauge 6. A ring shaped covering sheet 8 covers each vertical hole 4.

A minimum sensitive load limit that can be sensed by the load sensing device 1 having the above mentioned construction is predetermined. This predetermined minimum sensitive load limit is, for example, 500 kilograms (kg). Minimizing of the minimum sensitive load limit can be achieved by an improvement of a sensitivity of the load sensing device 1 when a lighter load is loaded.

The sensitivity of the device 1 depends on the amount of strain occurring in the strain portions 5 when a load is applied to the load bearing portion 2. Thus a larger amount of strains caused by a certain applied load results in a higher sensitivity of the device 1 for the certain load.

The following two methods are apparent for this larger amount of strain: (I) to shorten the height h of the device 1 itself so as to reduce vertical thicknesses of the strain portion; (II) to enlarge the vertical holes 4 so as to reduce the intervals between the vertical holes 4, that is, to reduce the horizontal thicknesses of the strain portions 5.

However, the following problems occur if the method (I), that is thinning of the device 1, is applied. Strains occur with respect to a horizontal component of a load applied if the load includes a horizontal component, that is, if a direction of the applied load slants from the vertical direction. A first problem is that such strains as resulting from a component of an applied load other than a vertical component of the applied load may cause error of the load sensing.

A second problem is that, excessive shortening of the height h of the device 1 can cause a difficulty in attaching the strain gauges 6 on the side walls of the strain portions 5. Such problems define a limit of thinning of the device 1. Thus, it is difficult to improve the sensitivity of the device 1 by thinning of the device 1 itself.

On the other hand, the following problem in the manufacturing stage occurs if the method (II), that is, reducing the horizontal thicknesses of the strain portions 5, is applied. The vertical holes 4 are bored successively in the cylinder having the height h. Then the material of the strain portion 5 escapes toward an already bored vertical hole 4 as a result of the pushing force of a drill bit because the horizontal thickness of the strain portion 5 is too thin. Such pushing force of the drill bit occurs when a neighboring vertical hole 4 is being bored near an adjacent, already bored, vertical hole 4. This escaping of the strain portion 5 degrades boring accuracy.

As per the above mentioned reason, it is difficult to improve the sensitivity of the device 1, and thus the minimum sensitive load limit could not have been minimized in the device 1 of the prior art.

SUMMARY OF THE INVENTION

An object of the present invention is to provide a load sensing device having high sensitivity for a relatively light load.

To achieve this object, a load sensing device according to the present invention comprises:

a body portion comprising a load bearing portion for being displaced due to a load being applied thereto in a load applying direction, and a plurality of strain portions for being strained as a result of displacement of the load bearing portion due to a load being applied thereto, the plurality of strain portions being respectively integrated with the load bearing portion in positions symmetrical to each other with respect to the load bearing portion; and wherein the plurality of strain portions respectively have horizontal holes formed in directions respectively approximately perpendicular to the load applying direction; and the load sensing device further comprises strain sensing means for sensing strains occurring in the plurality of strain portions so as to sense a load applied to the load bearing portion.

A construction as mentioned above, such that the plurality of strain portions are provided respectively integrated with the load bearing portion in positions symmetrical to each other with respect to the load bearing portion; and the plurality of strain portions respectively have horizontal holes formed in directions respectively approximately perpendicular to the load applying direction, enables the following advantages: The strain portions can become susceptible to strain as a result of a displacement of the load bearing portion, even if the necessary height of the load bearing portion in retained.

Thus, a desired strain can occur in the strain portions as a result of a load being applied on the load bearing portion, even if the load is a rather light one. Further, error in load sensing can be eliminated, which error may occur as a result of a load component, perpendicular to a load applying direction, and which component may occur as a result of minimizing the height of the load bearing portion. Thus, the lighter load can be sensed, also load sensing that is free or error occurring as a result of a horizontal component of the load, can be realized.

Other objects and further features of the present invention will become more apparent from the following detailed description when read in conjunction with the accompanying drawings.

DESCRIPTION OF THE PREFERRED EMBODIMENT

Figure 1:
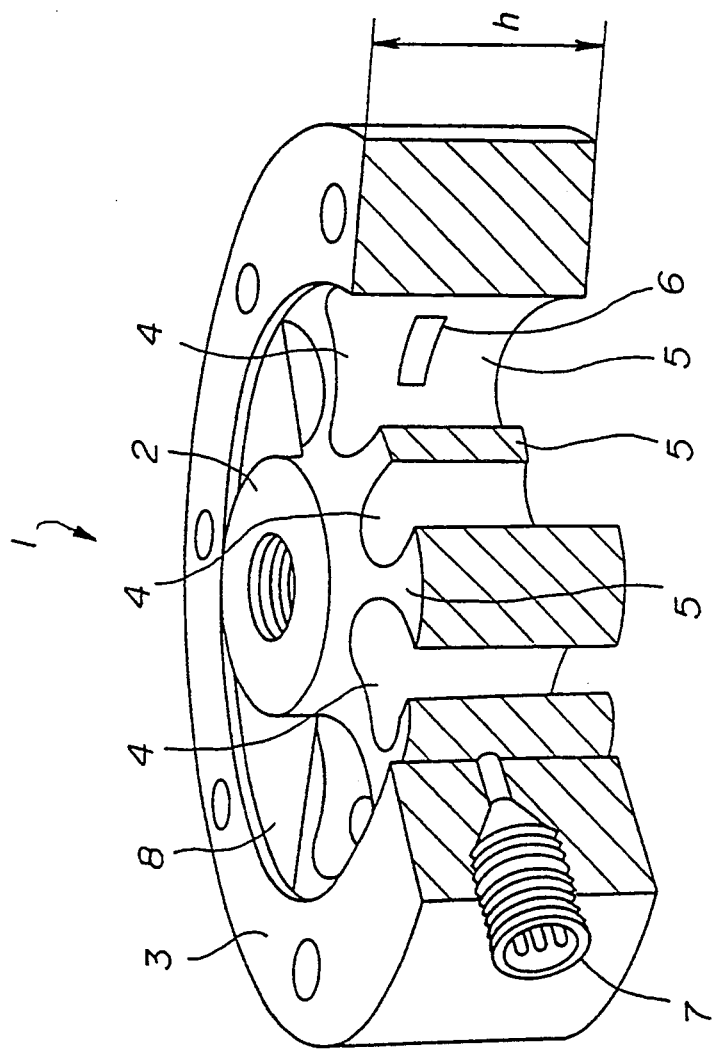
FIG. 1 shows a top, front perspective view, a front part having been cut and removed for the sake of explanation, of the load sensing device of the prior art.
Figure 2:
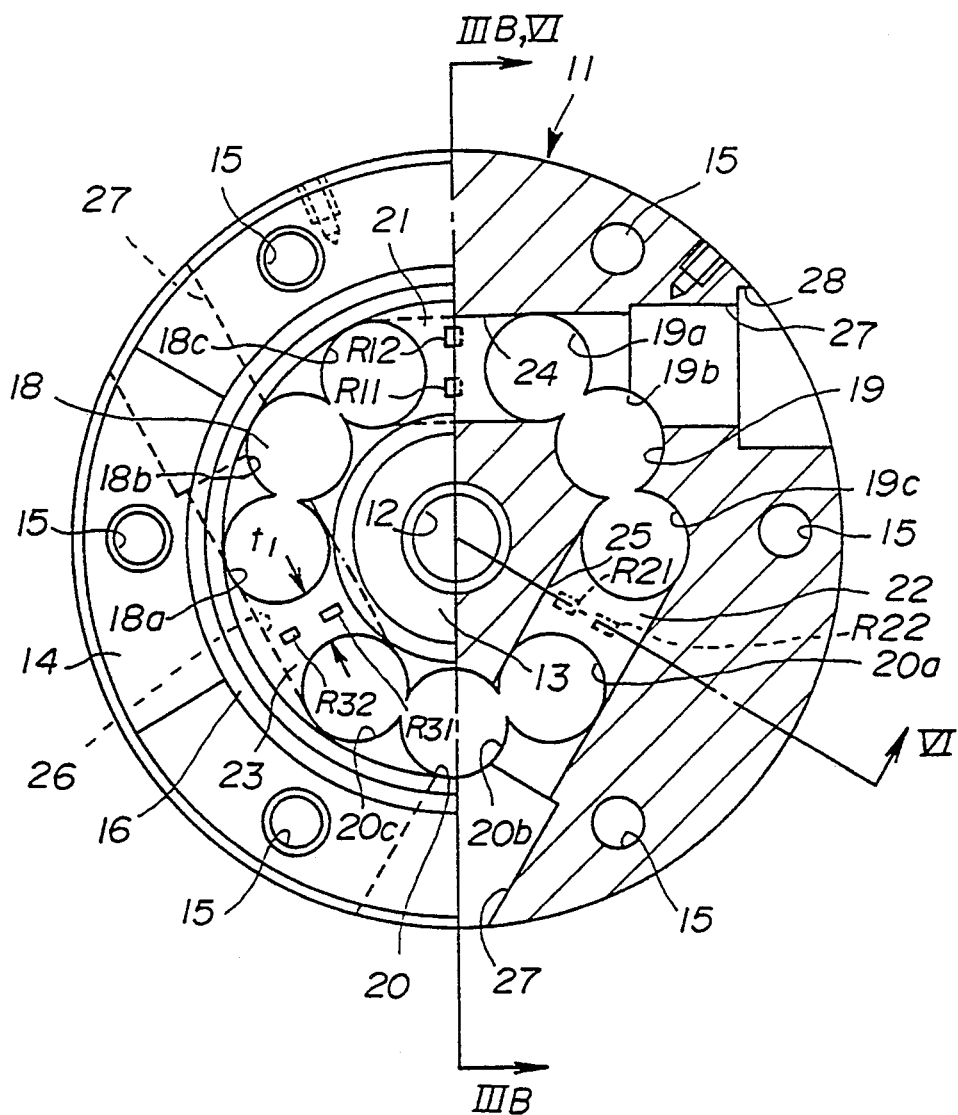
FIG. 2 shows a plan view of a left half of a load sensing device of a first embodiment according to the present invention (with a covering sheet for strain portions removed) viewed from a direction IIA of FIG. 4; and a horizontal sectional view of a right half thereof viewed along a line IIB—IIB of FIG. 3.

A construction of a load sensing device 10 of a first embodiment according to the present invention is described below with reference to FIGS. 2 through 4.

A body 11 of the load sensing device 10 is made of an aluminum material having a round sectional shape, the material is cut so that a disk shaped body 11 having a height h is formed. Then, a cylindrical shaped load bearing portion 13, a top of which protrudes upward vertically, and which comprises a central part of the body 11; and a central hole 12 is bored in a central part of the load bearing portion 13. Six fixing bolt holes 15 are respectively bored on top and bottom surfaces of a ring shaped outer edge portion 14, in which holes fixing bolts (not shown) are inserted, and which holes are placed so as to be apart from each other with angles of 60 degrees between centers of respective neighboring holes with respect to the load bearing portion 13.

Steps are respectively formed to form circles on top and bottom surfaces of a part between the load bearing portion 13 and the outer edge portion 14 so that ring shaped grooves 18 and 17 are formed there, in which grooves covering sheets 31 (partially shown in FIG. 4) are respectively fitted. The covering sheets 31 are used for closing strain portions. Three vertical holes 18, 19 and 20 are formed to pass through, vertically, between the top and bottom surfaces of the part between the load bearing portion 13 and the outer edge portion 14, which surfaces respectively correspond to bottoms of the grooves 18 and 17. The vertical holes 18 through 20 are bored so as to be apart from each other with angles of 120 degrees between centers of respective neighboring holes with respect to the load bearing portion 13.

Such vertical holes as 18 through 20, for example, the hole 18 comprises three small circularly shaped holes 18a, 18b and 18c, each of which is bored by means of a drill having a small diameter, and each of which partially overlap with each other. Similarly, the vertical holes 19 and 20 respectively comprise small circularly shaped holes 19a, 19b and 19c; and 20a, 20b and 20c. The vertical holes 18 through 20 are not limited to such shapes; but vertical holes extending along arcs with respect to the central hole 12 formed by, for example, the end milling, can be used instead.

Remaining parts between the vertical holes 18 and 19, 19 and 20, and 20 and 18 between the load bearing portion 13 and the outer edge portion 14 respectively correspond to strain portions 21, 22, and 23, which strain portions 21 through 23 are formed to be apart from each other with angles of 120 degrees between centers of respective neighboring holes with respect to the load bearing portion 13. Horizontal thicknesses $t_1$ of the strain portions 21 through 23, shown in FIG. 2, which thicknesses correspond to wall thicknesses, are respectively predetermined, so that the strain portions 21 through 23 respectively have sufficient strengths so that a deformation is prevented of one of the strain portions 21 through 23, as a result of the hole wall being pushed by a drill bit when one of the vertical holes 18 through 20 is bored by means of the drill bit in the manufacturing stage, as mentioned above in description of the prior art.

Figure 3:
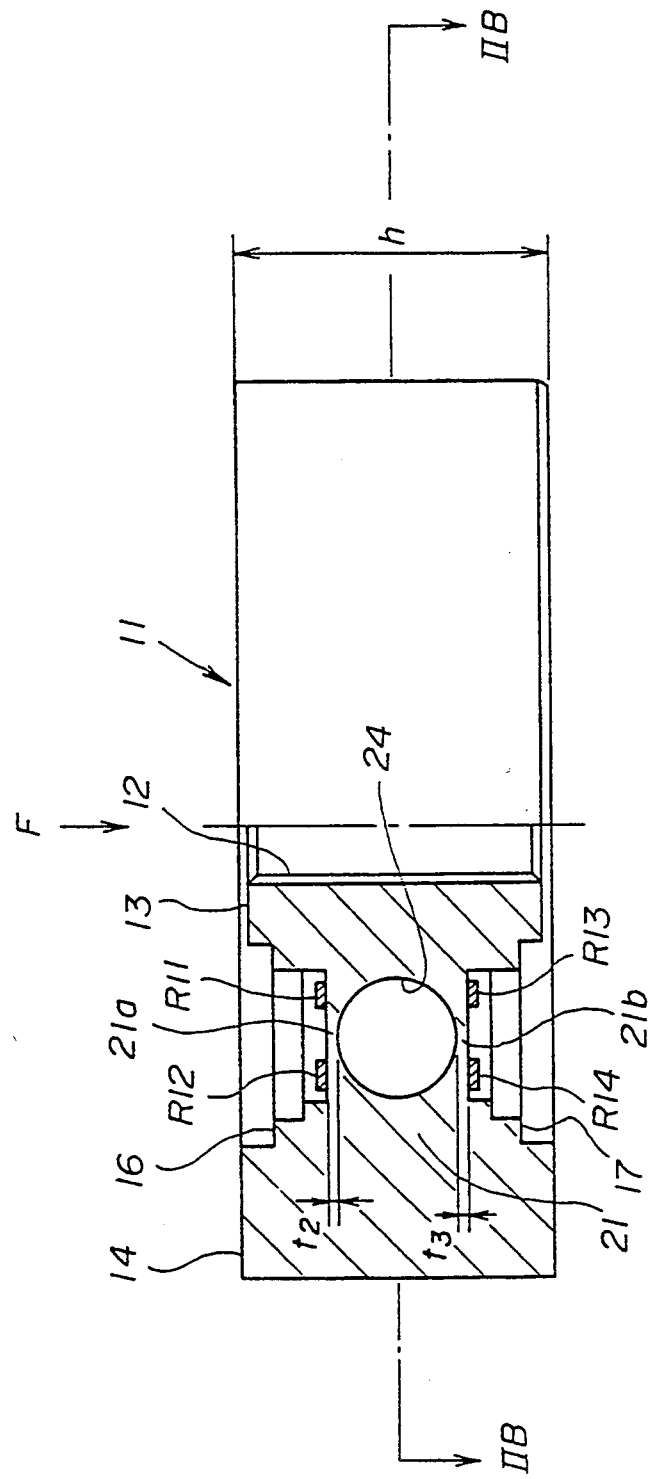
FIG. 3 shows a side view of a right half of the load sensing device shown in FIG. 2 viewed from a direction IIIA of FIG. 4; and a vertical sectional view of a left half thereof along a line IIIB—IIIB of FIG. 2 thereof.
Figure 4:
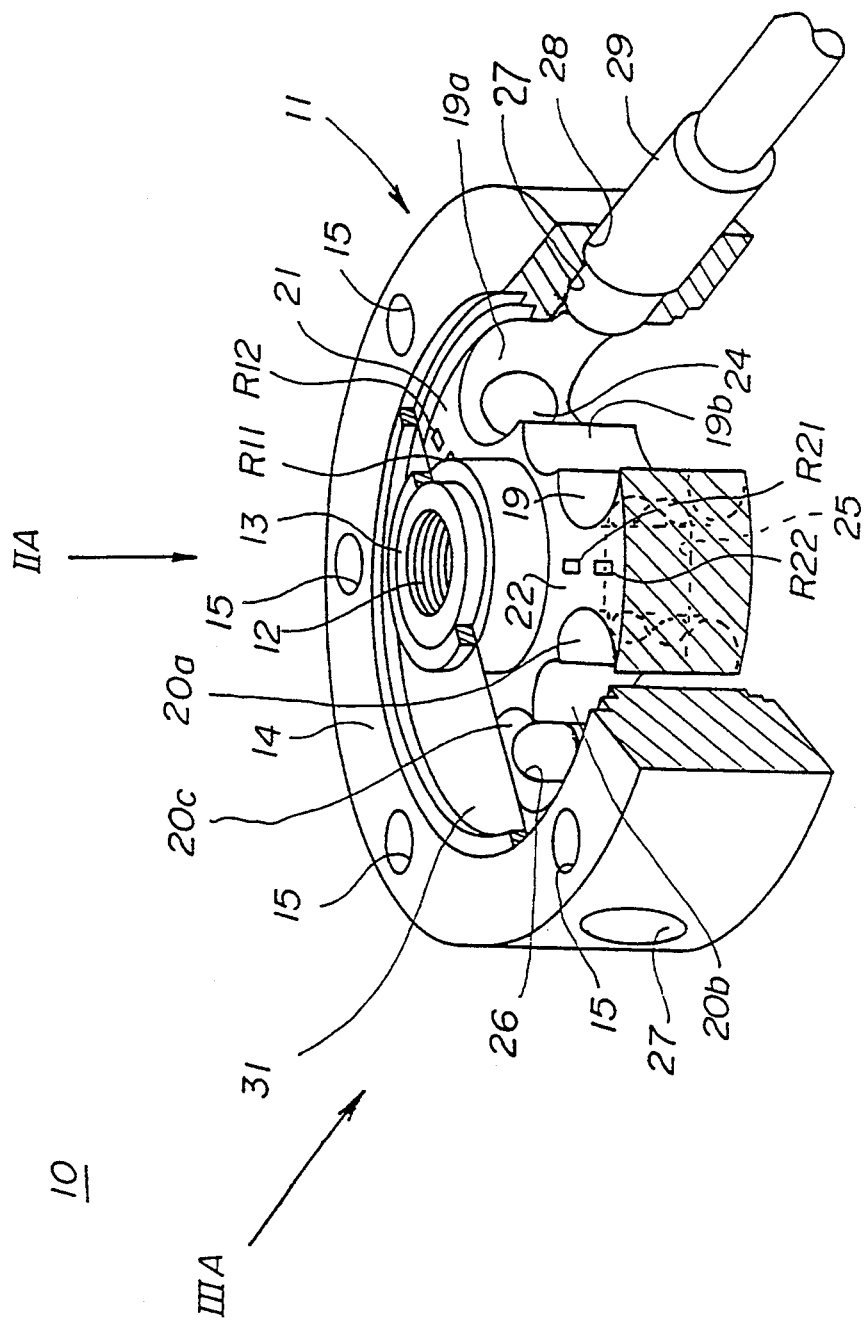
FIG. 4 shows a top, front perspective view of the load sensing device shown in FIG. 2, a front part having been cut and removed for simplicity of explanation.

Horizontal holes 24, 25, and 26 are formed so as to respectively extend approximately along tangent directions (along the horizontal plane corresponding to the horizontal line in FIG. 3) of the load bearing portion 13. The horizontal holes 24 through 26 are made as a result of boring from an outer side wall of the outer edge portion 13, the holes then passing through the strain portions 21 through 23. These horizontal holes are made so that these horizontal holes 24 through 26 respectively separate the strain portions 21 through 23 into top beams 21a, 22a and 23a; and bottom beams 21b, 22b and 23b.

These horizontal holes 24 through 26 are bored after the vertical holes 18 through 20 are bored. A reason for this is that, for example, wall thicknesses t₂ and t₃ of the top beam 21a and the bottom beam 21b in FIG. 3, respectively, become considerably thin, thus requiring high boring accuracy for the strain portion 21.

Horizontal holes 27, having diameters larger than the horizontal holes 24 through 26, are bored before the horizontal holes 24 through 26 are bored. A reason of this is that these larger diameter holes 27 function, when the smaller diameter holes 24 through 26 are bored, so as to decrease frictions occurring between a drill bit and walls during boring by means of a drill bit. Thus, the boring accuracy can be ensured. Further, horizontal holes 27 and 28 located in a top right position in FIG. 2, bored in the outer edge portion 14, are used for inserting and fitting a connector 29, shown in FIG. 4, which connector is used for strain gauge wiring.

For example, one pair of strain gauges R11 and R12 are respectively adhered on a top surface of the above mentioned top beam 21a, so as to be located on an inner side and outer side respectively. Further, one pair of strain gauges R13 and R14 are respectively adhered on a bottom surface of the above mentioned bottom beam 21b, so as to be located on an inner side and outer side respectively.

For example, a position of a horizontal hole 24 in a sectional view of FIG. 3 does not need to be limited to such as is shown FIG. 3; other positions, inner and outer along the radial directions of the body 11, upper and lower in the axial direction of the body 11 may be used.

The strain gauges R11 and R12, and R13 and R14 are located so as to respectively straddle the horizontal hole Four strain gauges R21, R22, R23 and R24 are respectively adhered on the strain portion 22 in the same manner as the above mentioned for the strain gauges R11 through R14 on the strain portion 21; also, four strain gauges R31, R32, R33 and R34 are respectively adhered on the strain portion 23 in the same manner as the above mentioned for the strain gauges R11 through R14 on the strain portion 21.

Figure 5:
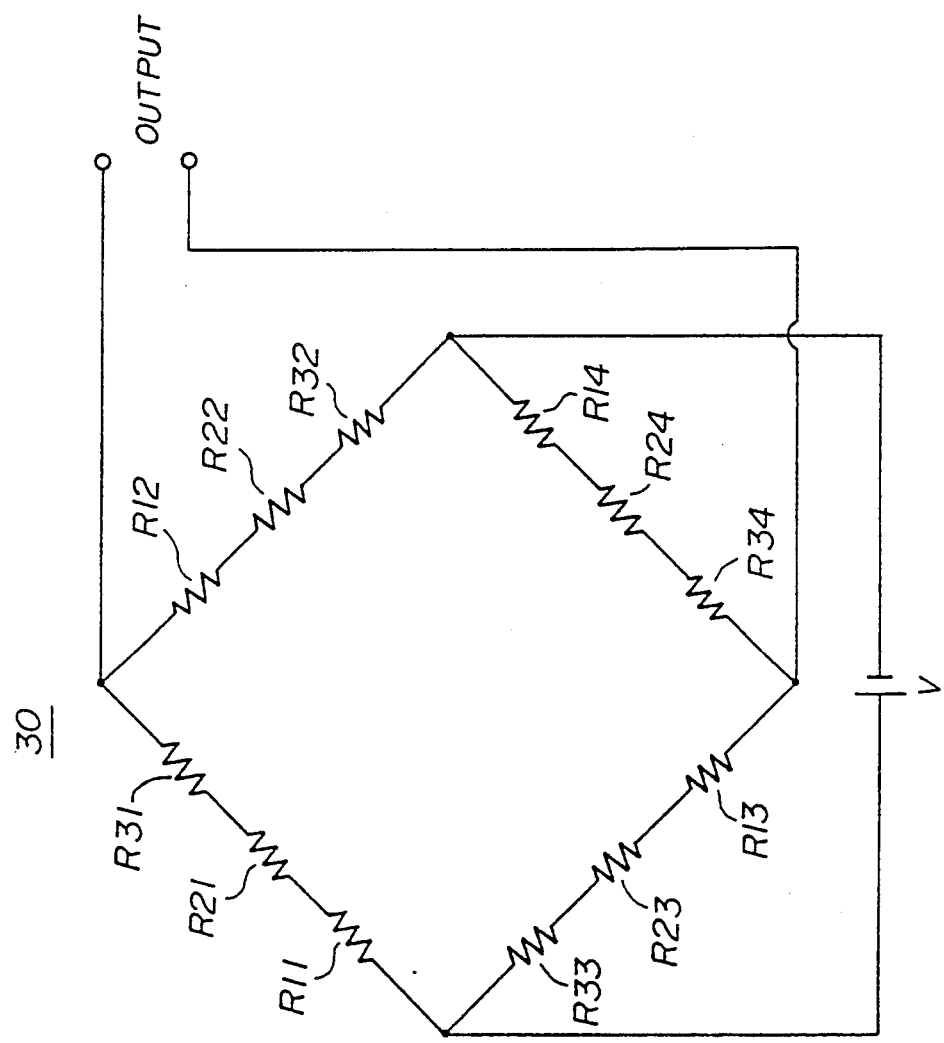
FIG. 5 shows a circuit diagram of a bridge circuit comprising strain gauges wired together.

A total of twelve strain gauges R11 through R14, R21 through R24, and R31 through R34 (strain sensing means) respectively provided on the strain portions 21 through 23 form a bridge circuit 30 (an output circuit) as shown in FIG. 5. Each arm of the bridge circuit 30 comprises three strain gauges that are connected in series to each other, and that are located in positions corresponding to each other on the strain portions 21 through 23, that is, top inner; top outer; bottom inner; or bottom outer, such as (R11, R21, and R31); (R12, R22, and R32); (R13, R23, and R33); or (R14, R24, and R34).

A manner of deformations of the strain portions 21 and 22 as a result of a load F being applied on the load bearing portion 13 is described below with reference to FIG. 6. The load bearing portion 13 is displaced downward as a result of the load F being applied, so that four positions where the strain gauges are adhered around the horizontal hole, for example, respective positions of strain gauges R11, R12, R13, and R14 for the hole 24 or respective positions of strain gauges R21, R22, R23, and R24 for the hole 25 in FIG. 8; approximately form a parallelogram as a result of making the four positions correspond to vertexes of a quadrangle. Then, compressive strains occur as a result of compressive stresses being applied to the top inner strain gauges R11, R21, and R31 which are respectively located on inner sides with respect to the radial directions of the body 11 of the top beams 21a, 22a, and 23a of the strain portions 21, 22, and 23. At the same time, tensile strains occur as a result of tensile stresses being applied to the top outer strain gauges R12, R22, and R32, which are respectively located on outer sides with respect to the radial directions of the body 11 of the top beams 21a, 22a, and 23a of the strain portions 21, 22, and 23.

At the same time, tensile strains occur as a result of tensile stresses being applied to the bottom inner strain gauges R13, R23, and R33, which are respectively located on inner sides with respect to the radial directions of the body 11 of the bottom beams 21b, 22b, and 23b of the strain portions 21, 22, and 23. At the same time, compressive strains occur as a result of compressive stresses being applied to the bottom outer strain gauges R14, R24, and R34, which are respectively located on outer sides with respect to the radial directions of the body 11 of the bottom beams 21b, 22b, and 23b of the strain portions 21, 22, and 23.

Thus, each of the strain gauges is connected in the bridge circuit 30 so that compressive strain sensing circuits (respectively comprising strain gauges to which compressive stresses are applied) respectively become opposite arms of the bridge circuit 30 of FIG. 5, such as (R11, R21, and R31) and (R14, R24, and R34). At the same time, tensile strain sensing circuits (respectively comprising strain gauges to which tensile stresses are applied) respectively become opposite arms of the bridge circuit 30 of FIG. 5, such as (R12, R22, and R32) and (R13, R23, and R33).

The strain gauges are respectively formed from epoxy resin films, then patterns of miniature electric resistance foils are print-formed on the films. The films thus, respectively have the following properties; electric resistances increase as a result of lines of the thinning of the foils caused by occurring tensile strains. On the other hand, electric resistances decrease as a result of the thickening of the lines of the foils which thickening is caused by the occurring of the compressive strains.

Three series connected strain gauges respectively sensing compressive stresses or tensile stresses form each arm of the bridge circuit 30. Thus, a voltage can be applied to the bridge circuit 30, which voltage is three times the magnitude of the case where only one strain gauge forms each arm of a bridge circuit. Thus, output having a relatively high voltage magnitude can be obtained.

Advantages obtained by the load sensing device 10 of the first embodiment according to the present invention, the construction of which is mentioned above, are described below. Elasticities of the strain portions 21 through 23 can be respectively adjusted by respectively varying dimensions of the horizontal holes 24 through 26. These horizontal holes 24 through 26, respectively formed in the strain portions 21 through 23, respectively function so that the strain portions 21 through 23 become relatively easy to deform.

Thus, a height dimension h of the body 11 can be ensured, because minimizing of the height dimension h for the purpose of obtaining ease of deformation of the strain portions is not needed. Also, loss of strength in the boring stage as a result of thinning wall thicknesses $t_1$ in the horizontal direction of the strain portions 21 through 23 can be eliminated. Additionally, high sensitivity can be obtained as a result of thinning wall thicknesses $t_2$ and $t_3$ in the vertical direction of the strain portions 21 through 23. This is because the thinning of wall thickness $t_2$ and $t_3$ provides ease of deformation, and also provides high sensitivity, as mentioned above.

As a result of this, for example, a minimum-load sensing limit of a load sensing device 10 according to the present invention can be lowered to be approximately 10 kilograms (kg) as a result of minimizing the wall thickness $t_2$ and $t_3$ in the vertical direction, while a minimum-load sensing limit of another device in the prior art having approximately the same body dimension as the device of the present invention is approximately 500 kg.

Figure 6:
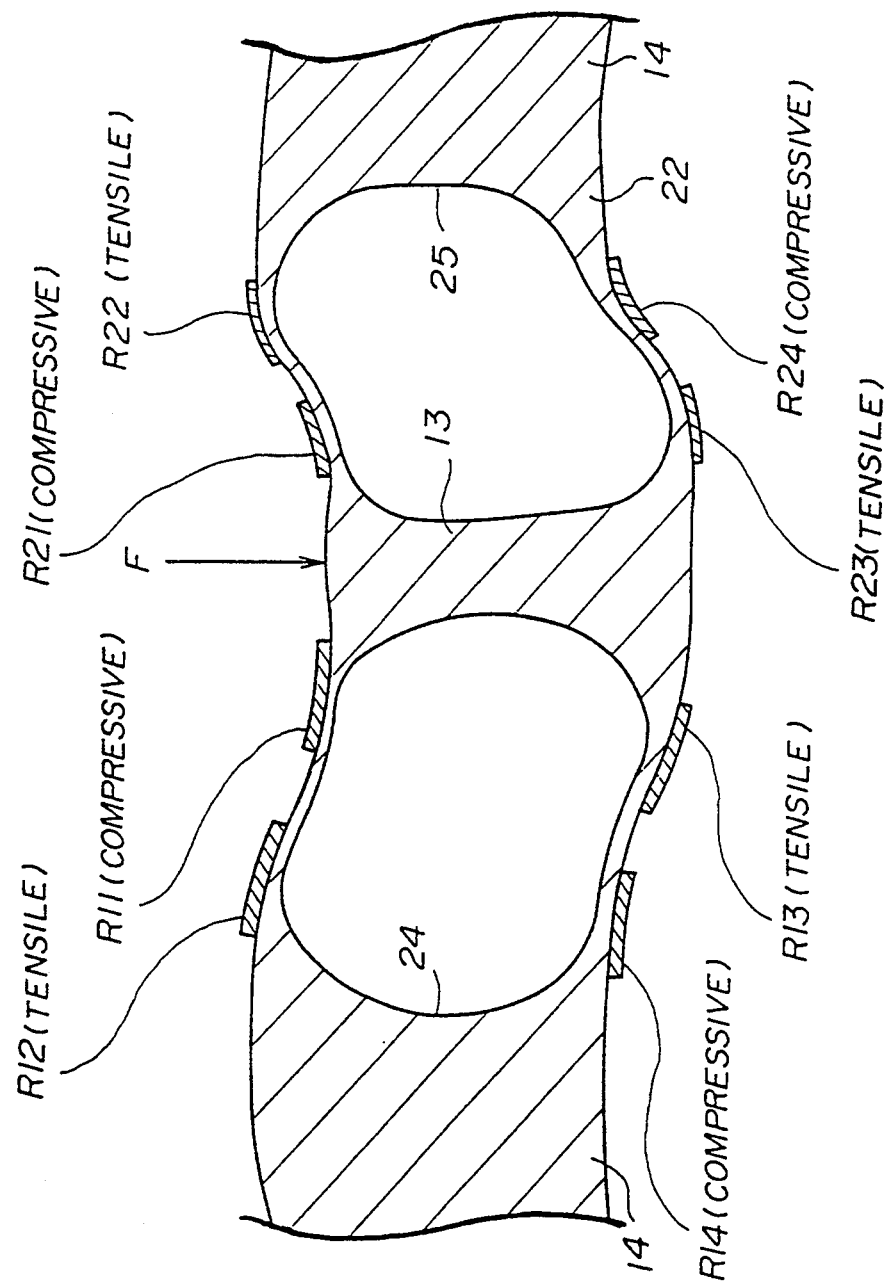
FIG. 6 shows a magnified vertical sectional view along a line IIIB-VI of an inner part of an outer edge portion, a load bearing portion and two of three strain portions of a load sensing device according to the present invention, in a condition of a load being applied to a load bearing portion.

Further, the strain portions 21 through 23 can be strained so as to become like a parallelogram in shape, as shown in FIG. 6 and mentioned above, as a result of having the horizontal holes 24 through 26. Thus, a relatively light load can cause larger strains in the strain portions 21 through 23. This results in that high sensitivity can be obtained.

Further, strains occurring in the strain portions 21 through 23 and sensed by the strain gauges R11 through R34 can be added together as a result of the strain gauges being connected, so that the above mentioned compressive strain sensing circuits and tensile strain sensing circuits respectively become opposite arms in the bridge circuit 30. Thus, the strains can be sensed with high accuracy in the output of the bridge circuit 30.

Further, effects caused in the strain portions 21 through 23 by horizontal components of a load applied to the load bearing portion 13 can be restricted as a result of such effects respectively caused in the strain portions 21 through 23 being canceled with each other due to a device construction described below. The strain portions 21 through 23 are located so as to be symmetrical to each other with respect to the load bearing portion 13. Further, the top beams 21a through 23a and the bottom beams 21b through 23b are located in parallel to each other in the top and the bottom.

Thus, deformation and/or inclination with respect to the horizontal direction of the load bearing portion 13 can be prevented. This eliminates error in load sensing caused by the horizontal components of a load being sensed by the strain gauges, thus enabling a precise sensing of the vertically applied load.

The number of strain portions 21 through 23 is not limited to three (3); more than three strain portions can be provided. However, these strain portions should be located symmetrically to each other with respect to the load bearing portion 13.

Further, locations of the strain gauges R11 through R34 are not limited to the top and bottom surfaces of the strain portions 21 through 23, but, for example, the strain gauges can be adhered on side surfaces of the strain portions 21 through 23.

Figure 7:
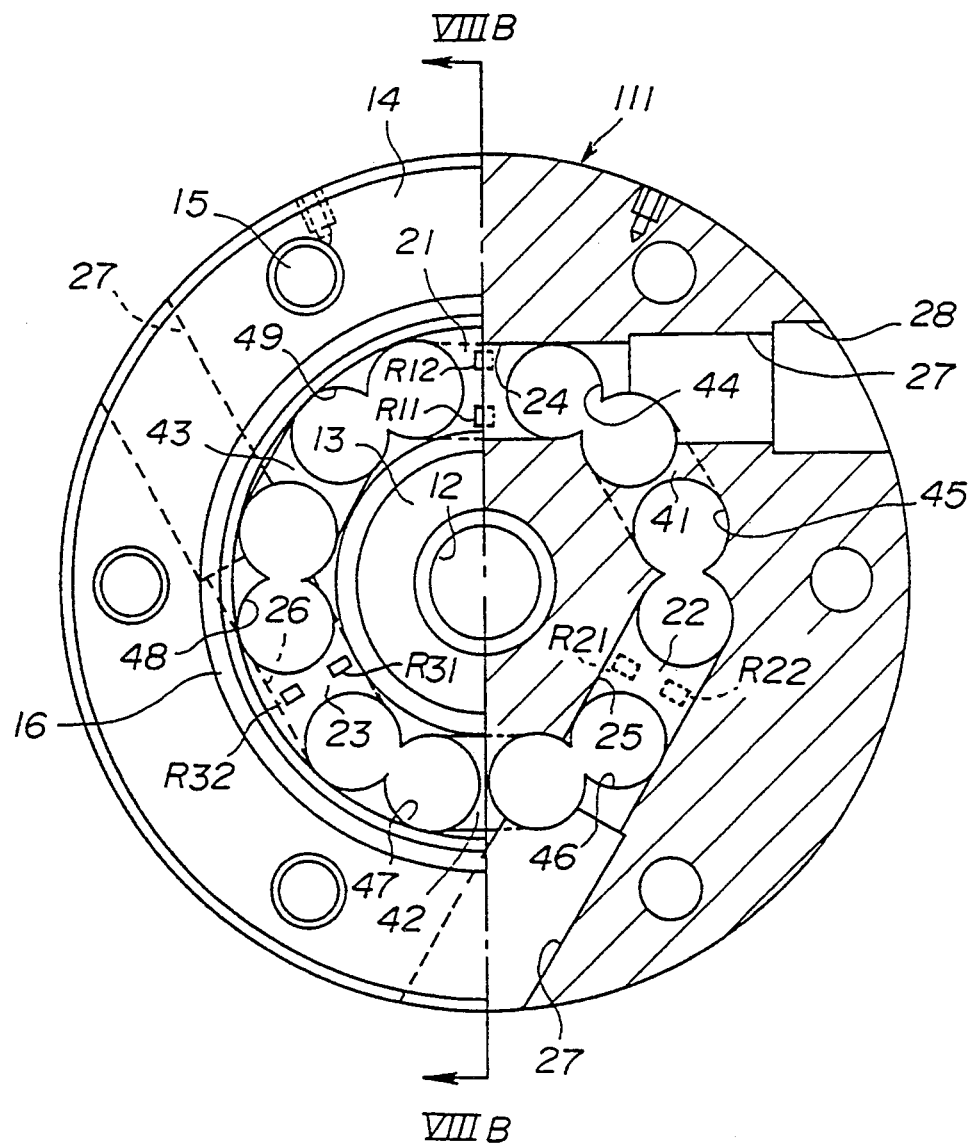
FIG. 7 shows a plan view of a left half of a load sensing device of a second embodiment of the present invention (with a covering sheet for strain portions removed) viewed from a direction VIIA of FIG. 9; and a horizontal sectional view of a right half thereof viewed along a line VIIB—VIIB of FIG. 8.

A load sensing device 100 of a second embodiment according to the present invention is described below with reference to FIGS. 7 through 9. The load sensing device 100 results from modifying the load sensing device 10 of the first embodiment with respect to the maximum-load sensing limits. That is, the maximum-load sensing limit of the load sensing device 100 becomes heavier than that of the load sensing device 10. A description of parts of the load sensing device 100 is substantially the same as of corresponding parts of the device 10 and is hence omitted for the sake of briefness, corresponding parts of the device 100 are give the same numerals as corresponding parts of the device 10.

Making the maximum-load sensing limit relatively heavy can be realized by an enlargement of the outer diameter of the load sensing device. For example, the construction of device 10 shown in FIGS. 2 through 4 may be enlarged as a result of elongating of each dimension by the same elongating ratio. However, in the second embodiment, the intention involved is such that a desired relatively heavy maximum-load sensing limit can be obtained, while the elongating ratio of the device is minimized as compared with the above mentioned example. For this purpose, part shapes are modified.

Reinforcement beams 41 through 43 are provided between the strain portions 21 through 23 in addition to the enlarging of the outer dimension of the device 100.

The reinforcement beams 41 through 43 are formed by the following manner. Six vertical holes 44 through 49 are bored in a part between the load bearing portion 13 and the outer edge portion 14 so as to provide the holes 44 through 49 apart from each other with angles of 60 degrees between centers of respective neighboring holes with respect to the load bearing portion 13. Each vertical hole comprises two small holes bored vertically (in the vertical direction of FIG. 8) by means of a drill, parts of which holes overlap with each other, and which holes respectively have circular sectional shapes. Then the above mentioned strain portions 21 through 23 and the reinforcement beams 41 through 43 are alternately formed between the vertical holes 44 through 49 as a result of material remaining between the load bearing portion 13 and the outer edge portion 14.

Figure 8:
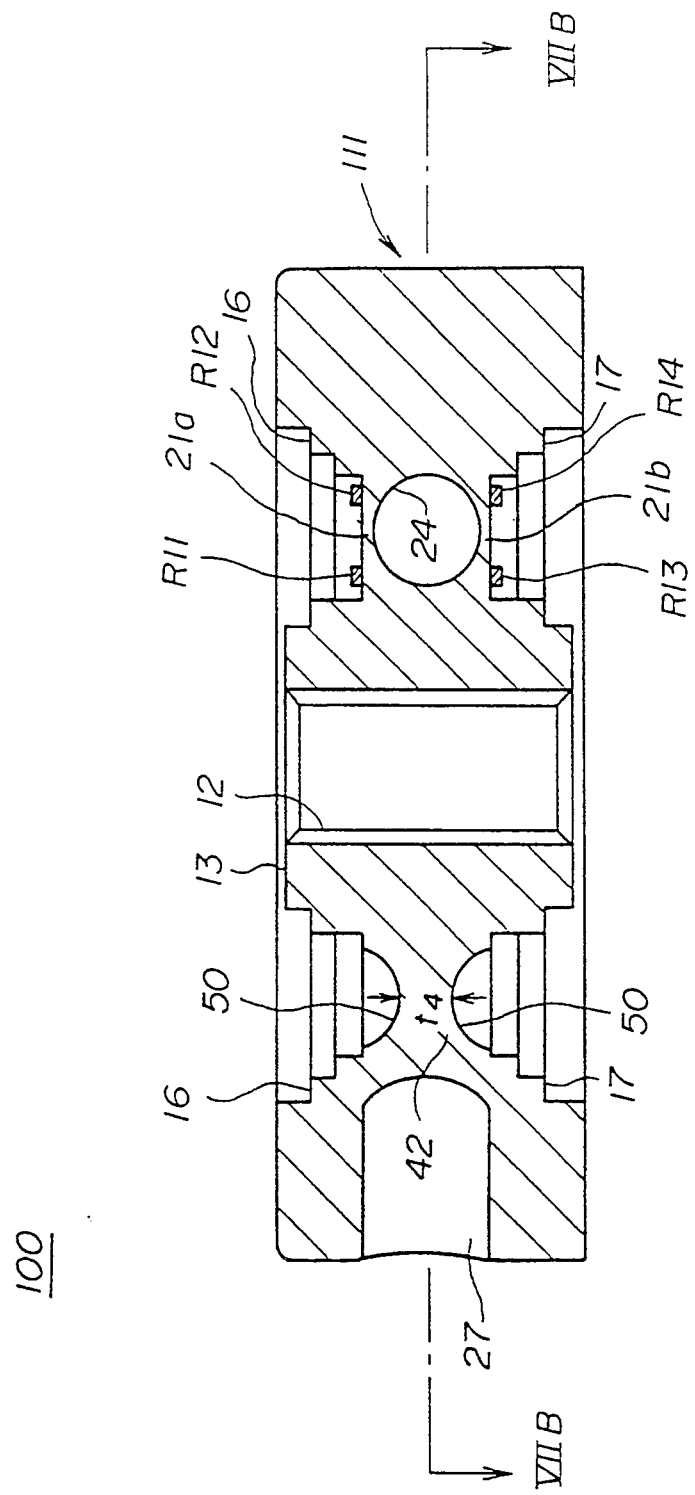
FIG. 8 shows a vertical sectional view of the load sensing device shown in FIG. 7 viewed from a direction VIIIA of FIG. 9, along a line VIIIB—VIIIB of FIG. 7.
Figure 9:
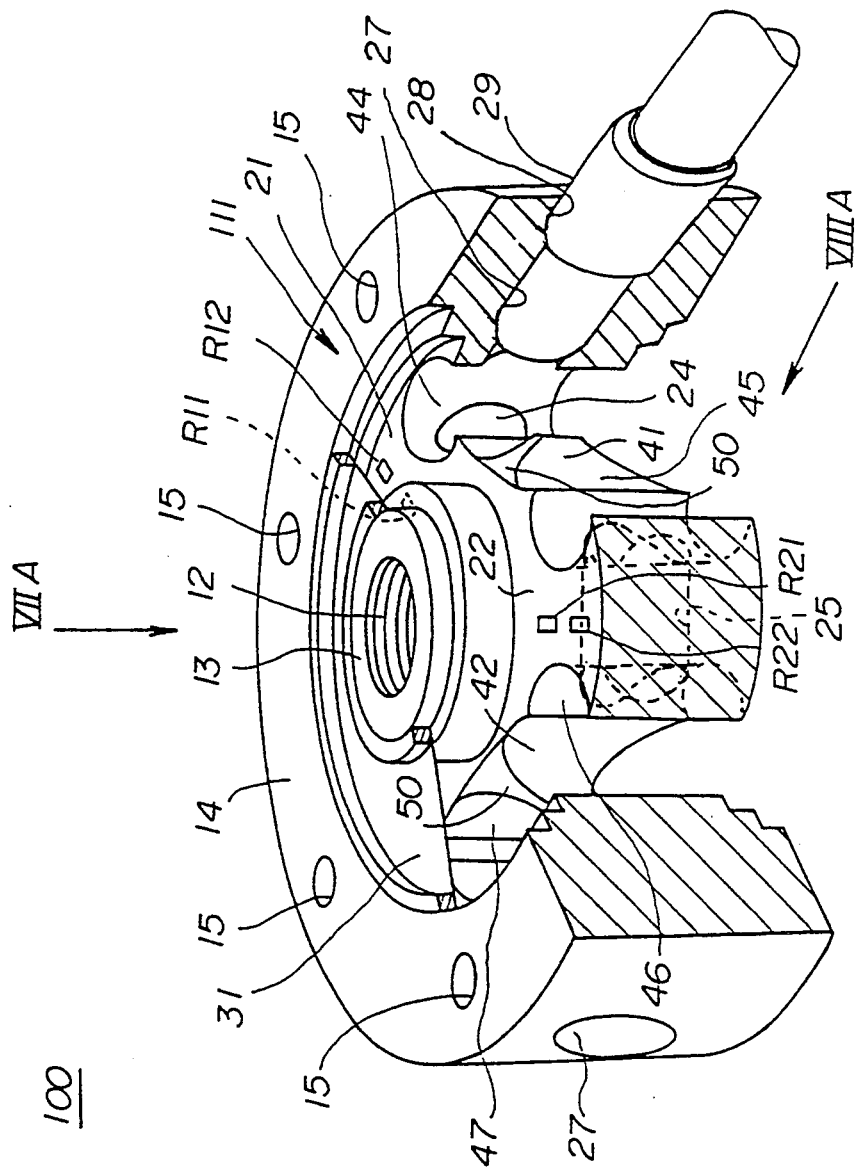
FIG. 9 shows a top, front perspective view, a front part having been cut and removed for simplicity of explanation, of the load sensing device shown in FIG. 7.

Half-sphere shaped cavities 50 are provided on top and bottom surfaces of each of the reinforcement beams 41 through 43, as shown in FIG. 8, thus the vertical thickness $t_4$ is reduced. This construction, such as the cavities 50 being provided for reinforcement beams 41 through 43, results in that the strengths of the reinforcement beams 41 through 43 can respectively become approximately the same as the respective strengths of the strain portions 21 through 23. This results in that a strain occurring in each of the reinforcement beams 41 through 43 as a result of a load being applied to the load bearing portion 13 becomes approximately the same as a strain occurred in each of the strain portions 21 through 23.

As a result of the above mentioned construction, such that the strain portions 21 through 23 and the reinforcement beams 41 through 43 are alternately provided around the load bearing portion 13, the maximum-load sensing limit can be effectively increased to a desired relatively heavy load value without much elongating of the outer dimensions. In addition to this advantage, the minimum-load sensing limit also can be relatively lowered in the same manner as mentioned above with regard to the first embodiment.

A description of a bridge circuit for the load sensing device 100 is eliminated because it is the same as that of the load sensing device 10 as shown in FIG. 5.

Figure 10:
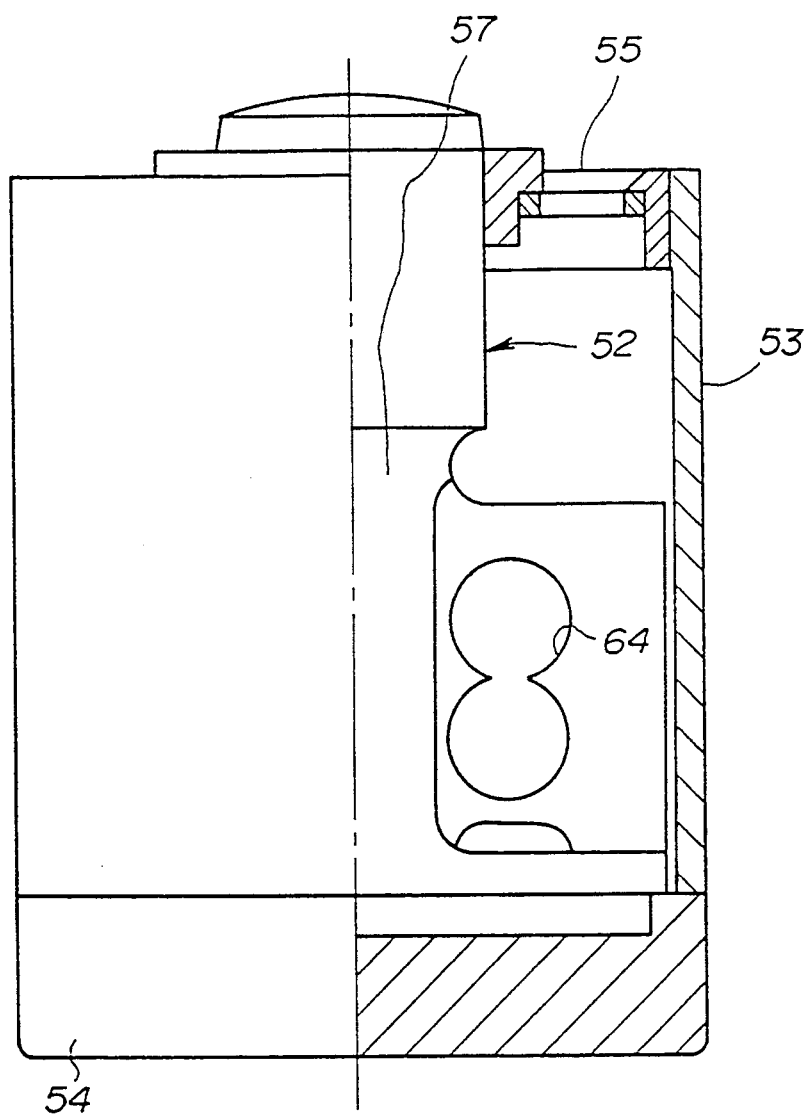
FIG. 10 shows a front view of a right half of a load sensing device of a third embodiment according to the present invention wherein an enclosure and lid have been cut and removed for simplicity of explanation, viewed from a direction XA of FIG. 14.

A load sensing device 151, shown in FIG. 10, of a third embodiment according to the present invention and a load sensing device 51, shown in FIGS. 11 through 14, of a fourth embodiment according to the present invention are described below. These devices 151 and 51 respectively have constructions slightly different from each other because they have, respectively, different maximum-load sensing limits. However, they have the same features according to the present invention. Thus, the same numerals are given to parts that corresponding to each other, and duplicated descriptions for these parts are omitted.

Each of the devices 151 and 51 comprises a body 52, a cylindrically shaped enclosure 53 for covering the body 52, a supporting base 54 for supporting the body 52, and a ring shaped lid 55 for closing a top of the enclosure 53. Further a connector fixing portion 56 is protruded on a side wall 53a of the enclosure 53, in which portion 56 a connector 29 is inserted.

A construction of the body 52 is described below.

Figure 12:
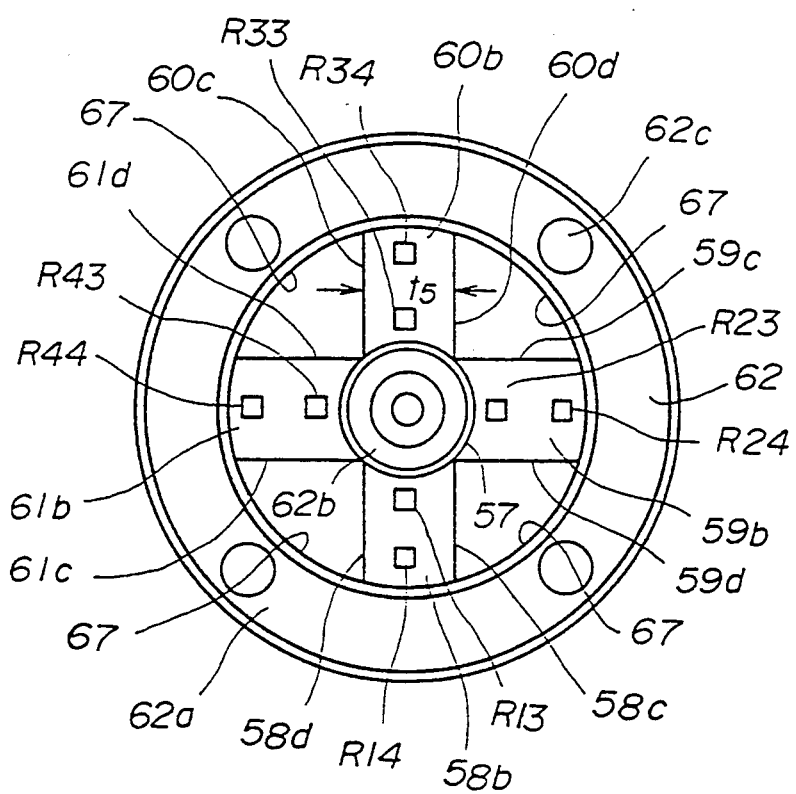
FIG. 12 shows a bottom view of the body of the load sensing device Shown in FIG. 11 viewed from a direction XII in FIG. 11.
Figure 13:
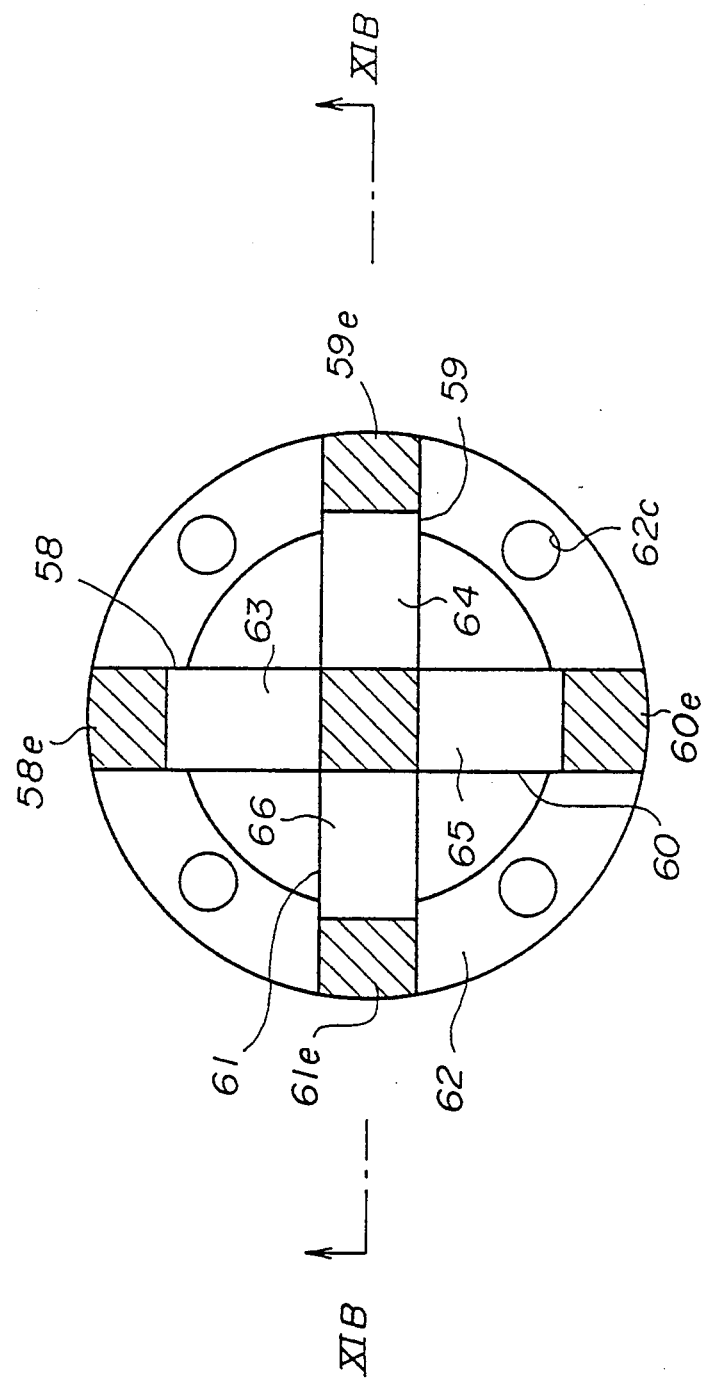
FIG. 13 shows a horizontally sectional view of the body shown in FIG. 11 viewed from a direction XIIIA in FIG. 11 along a line XIIIB—XIIIB in FIG. 11.
Figure 14:
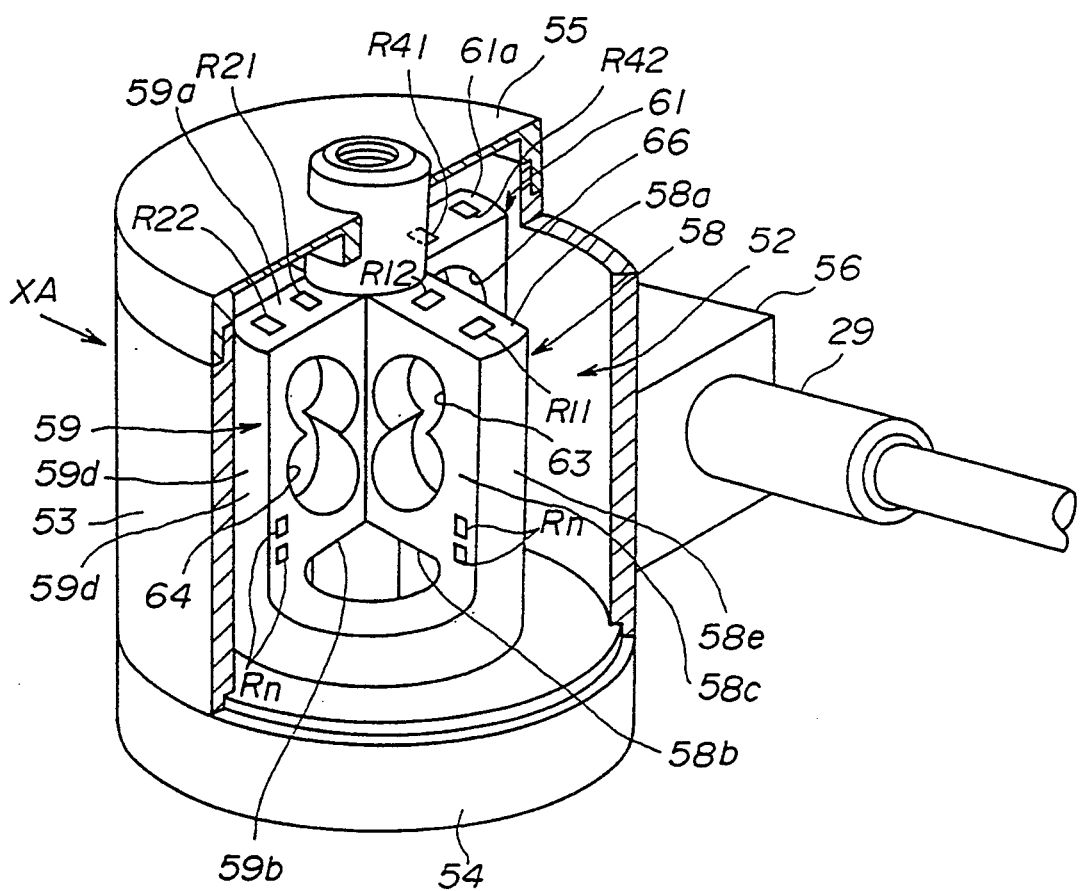
FIG. 14 shows a top, rear, side perspective view; a top, rear part of enclosure and lid having been cut and removed for simplicity of explanation; of the load sensing device of the fourth embodiment of the present invention, the body of which is shown in FIG. 11.

The body 52 comprises an approximately cylindrical load bearing portion 57, a top part of which portion 57 protrudes upward (as in FIG. 11), four sections of strain portions 58 through 61 extending horizontally (in the horizontal directions of FIG. 11,) radially from the load bearing portion 57, and a disk shaped bottom portion 62 for connecting bottom parts of the strain portions 58 through 61. Outer edge portions 58e through 61e are respectively located in radially outer edge sides of respective strain portions 58 through 61, which outer edge portions respectively extend vertically. Each of the strain portions 58 through 61 extends along vertical surfaces (along the vertical directions in FIG. 11), and is apart from adjacent strain portions angles of 90 degrees between their centers with respect to the load bearing portion 57, thus these four sections of strain portions 58 through 61 look like a cross viewed from the top (XIIIA direction in FIG. 11) as shown in FIGS. 12 and 13.

Thicknesses $t_5$ in the horizontal directions of the strain portions 58 through 61 are predetermined so as to have strength for preventing deformations in the boring stage. Horizontal holes 63 through 66 bored in the respective strain portions 58 through 81 pass through horizontally from side walls. Then top beams 68 respectively having thin thicknesses $t_6$ (as shown in FIG. 11) in the vertical direction are formed between top surfaces 58a through 61a and the horizontal holes 63 through 66 of respective strain portions 58 through 61.

Further, four cavities 67 and four fixing holes 62c are respectively hollowed in the bottom portion 62 from the bottom. The fixing holes 62c are used for fixing the body 52 onto the supporting base 54. Then bottom beams 69 respectively having thin thickness $t_7$ (as shown in FIG. 11) in the vertical direction are formed between top surfaces of respective cavities 67 and bottom surfaces of respective horizontal holes 63 through 66 of respective strain portions 58 through 61.

Figure 11:
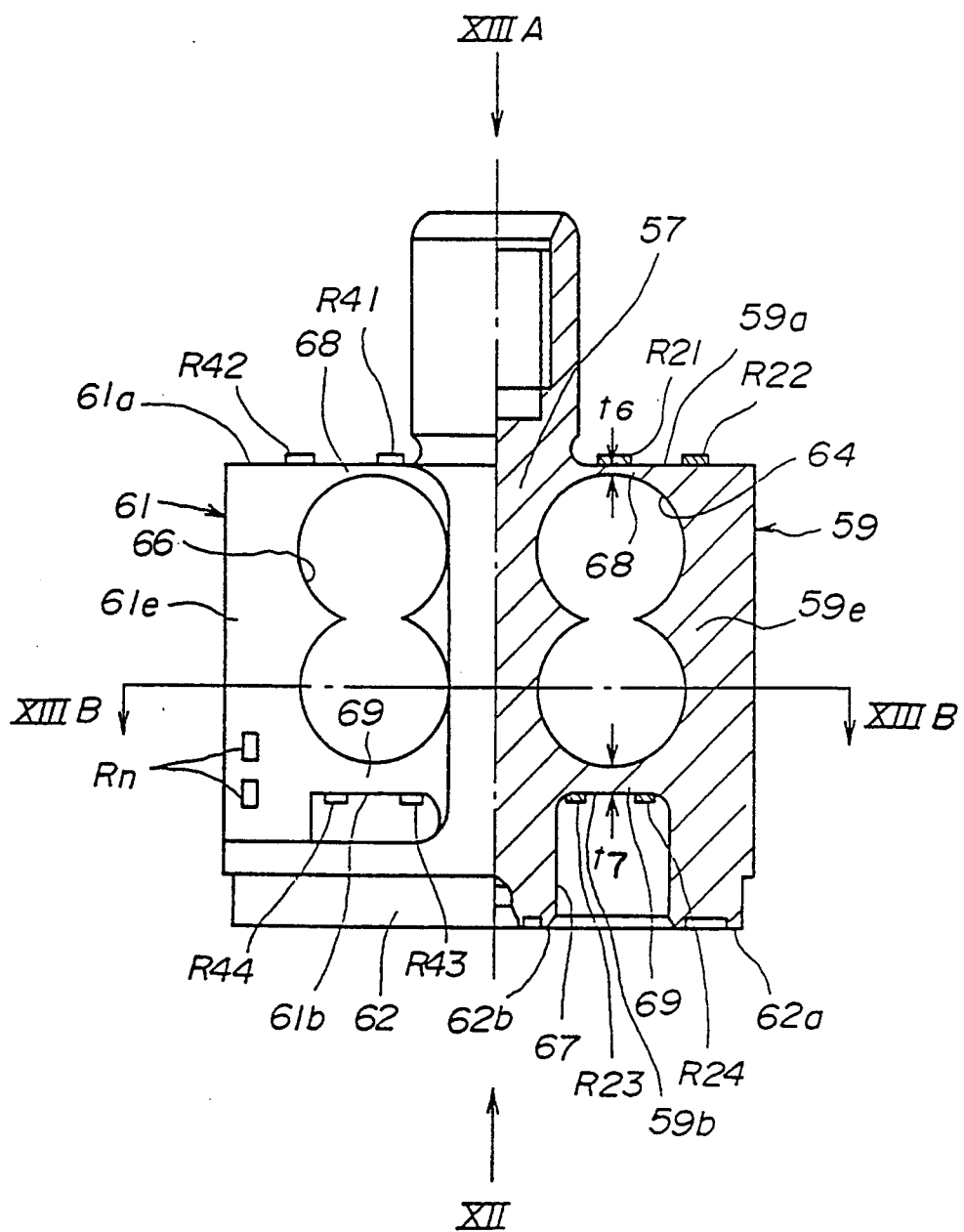
FIG. 11 shows a front view of a left half of a body of a load sensing device of a fourth embodiment (a construction is substantially approximately the same as the third embodiment, however rated load capacities are different from each other) of the present invention, and a vertically sectional view of a right half thereof along a line XIB—XIB of FIG. 13.

Then, approximate quadrangles (in sectional shape), for example, as shown in FIG. 11, are constituted by respective top beams 68, the respective outer edge portions 58e through 61e, the respective bottom beams 69, and the load bearing portion 57, which correspond to respective four sides of the respective approximate quadrangle. These respective approximate quadrangles become approximate parallelograms as a result of a load being applied to the load bearing portion 57, from the top.

An advantage obtained from a construction of the four sections of the strain portions 58 through 61 is described below. Elasticities of the strain portions are improved by the horizontal holes 63 through 66 and cavities 67 in the bottom portion 62 so that the strain portions become easy to deform by a vertical load being applied to the lead bearing portion 57. Thus, desired strains, which can be sensed, can occur in the strain portions. This means that a high sensitivity of load sensing can be obtained.

Further, a stopper portion 62b is protruded downward in a central part on the bottom surface of the bottom portion 62. A level of a bottom surface of the stopper portion 62b is predetermined so as to be slightly higher than a level of a bottom surface 62a of the bottom portion 62 in a condition such that no load is applied to the load bearing portion 57. That is, a very small space (not shown in FIG. 11) is provided between the bottom surface of the stopper portion 62b and a top portion of the supporting base 54 in the above mentioned condition.

The bottom surface of the stopper portion 62b is displaced downward as a result of a downward displacement of the load bearing portion in a loading condition. The above mentioned small space is predetermined such that the bottom surface of the stopper portion 62b may touch the top portion of the supporting base 54 when a load is applied to the load bearing portion 57, which load is in excess of an upper load limit of the load sensing device 51 or 151.

Then, after a load is applied to the load bearing portion 57, which load is in excess of the upper load limit, the load bearing portion 57 can not be displaced further downward as a result of the stopper portion 62b which is now supporting the load bearing portion 57. Thus, undesirable downward displacement of the load bearing portion 57, that is, undesirable strains on the strain portions 58 through 61 as a result of the above mentioned displacement of the load bearing portion 57, can be prevented. This results in preventing damage to the body 52. This stopper portion 62b acts as an overload stopper.

Strain gauges are adhered on top surfaces 58a through 61a and bottom surfaces 58b through 61b of respective strain portions 58 through 61. That is, for example, strain gauges R11 and R12 are attached on the top surface 58a of the first strain portion 58, and strain gauges R13 and R14 are attached on the bottom surface 58b of the first strain portion 58. Respective groups of four strain gauges (R21, R22, R23 and R24); (R31, R32, R33 and R34); and (R41, R42, R43 and R44) are attached on the top surface and the bottom surface of respective other strain portions 59 through 61, as the same manner as for the first strain portion 58.

Further, Nickel gauges Rn for temperature compensation are respectively adhered on both sides of walls 58c through 61c and 58d through 61d of respective strain portions 58 through 61.

Thus, a total of sixteen (16) strain gauges are provided for the strain portions 58 through 61, thus, a bridge circuit acting as an output circuit comprises the strain gauges so that respective strain gauges, which are located on positions corresponding to each other for respective strain portions 58 through 61, are connected in series to each other so as to consist of respective arms of the bridge circuit, in a similar manner as in the bridge circuit 30 for the load sensing device 10 of the first embodiment according to the present invention.

In comparing these embodiments with the load sensing devices 10 and 100 of the first and second embodiments according to the present invention, the following two advantages are obtained. The strain gauges R11 through R44 can be protected from damage by the enclosure 53, in which the body 52 is enclosed. Further, error in load sensing can be eliminated, which error is caused by stresses applied to the strain gauges in the horizontal directions. These stresses correspond to components in the horizontal directions of a load applied to the load bearing portion 57, and can be eliminated as a result of a length in the vertical direction of the load sensing device 51 or 151 being able to be lengthened.

Summarizing the advantages of the present invention, a load sensing device having a flexible construction can be realized, which flexible construction means that desired strain in a strain portion can easily occur during loading conditions, as a result of providing a hole extending along a direction (the horizontal direction) approximately perpendicular to a direction (the vertical direction) of the load being applied. Thus, a strength of the strain portion can be decreased so that desired strain can occur in the strain portion even if a load applied to a load bearing portion is relatively light. This results in high sensitivity of load sensing by means of strain gauge. Further, a precise sensing of a load in the vertical direction can be obtained as a result of preventing error in a load sensing which error is caused by stress in the horizontal direction, which preventing can be realized by ensuring a dimension in the vertical direction of the load sensing device.

Further, the present invention is not limited to the above described embodiments, and variations and modifications may be made without departing from the scope of the present invention.

What is claimed is:

1. A load sensing device having improved minimum load sensing characteristics, said device comprising:
   a load bearing portion for receiving the load applied to the device generally along an axis of the device;
   a support portion surrounding said load bearing portion, said load bearing portion being displaceable with respect to said support portion responsive to the applied load;
   a plurality of strain members extending between said load bearing portion and said support portion in a radial direction with respect to the axis of the device and spaced symmetrically about the axis, each of said strain members being formed of a pair of strain portions, said strain portions extending between said load bearing portion and said support portion in a manner generally parallel to each other, said strain portions of each strain member lying in a common plane containing said strain member, said common plane being parallel to the axis of the device, the strain portions of each strain member being spaced from each other in a direction parallel to the axis of said device by a hole extending completely through the respective strain member perpendicular to the common plane of said strain member, said strain portions being subjected to deformation upon the application of a load to the device such that upon being deformed, each pair of said strain portions, said load bearing portion, and said support portion generally form a parallelogram having a pair of acute angles; and
   strain sensing means coupled to said strain portions for sensing the strain occurring in said strain portions so as to sense the load applied to said load bearing portion.

2. The load sensing device according to claim 1, wherein:
   said strain sensing means comprises compressive strain sensing means and tensile strain sensing means located with respect to said strain portions such that said compressive strain sensing means are compressed and said tensile strain sensing means are stretched when deformation occurs in said plurality of strain portions due to a load being applied to said load bearing portion; and said compressive strain sensing means and tensile strain sensing means have respective electric resistances corresponding to respective strains occurring therein caused by deformation occurring in said plurality of strain portions; and
   said load sensing device further comprises an output circuit to which said strain sensing means are wired so that variations of electric resistances of said compressive strain sensing means, which variations occur when deformation occurs in said plurality of strain portions due to a load being applied to said load bearing portion, are added together and said strain sensing means are wired so that variations of electrical resistance of said tensile strain sensing means, which variations occur when deformation occurs in said plurality of strain portions due to a load being applied to said load bearing portion, are added together.

3. The load sensing device according to claim 1 wherein said support portion comprises a cylinder having a side wall, the axis of said cylinder comprising the axis of the device, wherein said load bearing portion lies along the axis of said device and wherein said holes in said strain members are formed through said side wall of said cylinder.

4. The load sensing device according to claim 1, wherein said shape of said strain portion has a width shorter than a length thereof, wherein said width thereof comprises a dimension along which said hole formed in said strain member extends and said length comprises a dimension along which said strain portion extends between said load bearing portion and said support portion.

5. The load sensing device according to claim 1, wherein said strain members each have the shape of a plate lying in the common plane containing said strain member, said common plane extending radially from the axis of the device, said strain member having a first dimension in said common plane which extends generally parallel to the axis of the device and having a second dimension in said common plane which is normal to said first dimension and which extends generally radially of said load bearing portion.

6. The load sensing device according to claim 1, wherein a number of said plurality of strain members is at least three.

7. The load sensing device according to claim 1 wherein said load sensing device has a plurality of holes extending therethrough in a direction parallel to the axis of said device, one such hole lying on either side of each of said strain members to define the shape of said strain members.

* * * * *